United States Patent Office 3,239,446
Patented Mar. 8, 1966

3,239,446
DEWAXING OF LUBRICATING OILS
Jacques Demeester and Jean-Bernard Maillart, Paris, France, assignors to The British Petroleum Company Limited of Britannic House, London, England, a British joint-stock corporation
No Drawing. Filed Aug. 31, 1962, Ser. No. 220,879
Claims priority, application France, Sept. 8, 1961, 872,740
3 Claims. (Cl. 208—33)

Modern processes for de-waxing lubricating oils containing paraffin wax generally comprise bringing about the crystallisation of the paraffin wax by cooling a solution of oil in a suitable solvent. The paraffin wax is separated by filtration on a rotary filter and the oily paraffin wax cake is finally washed on the filter drum using the same solvent at the filtration temperature, which frees it from most of the oil which it still contains. The solvent is then separated from the de-waxed oil phase and from the paraffin wax phase by distillation and is continuously recycled to contact a fresh charge of oil to be de-waxed.

The characteristics of the solvent have an important influence on the de-waxing operation because they control the following points: filtration output, selectivity of the separation, de-waxing differential (difference between the filtration temperature and the pour point of the de-waxed oil).

It is generally desirable to employ a mixture of two or more solvents so as to create the medium which is most favourable to the formation of crystals of paraffin wax. This result may be obtained by using a solvent in which liquid hydrocarbons are readily soluble together with a second liquid, frequently called an anti-solvent, which makes it possible to reduce the solubility of solid paraffin wax in the medium, whilst having little action on the solubility of the hydrocarbons which it is desired to retain in the oil after de-waxing. The results of the de-waxing are more favourable when this good selectivity of the solvent is achieved.

In a de-waxing unit for treating charges of lubricating oils of different composition obtained from petroleum fractions such as fluid distillate oils and treated distillation residues known as bright stocks, which fractions may have originated from different crude petroleum, it is advantageous to be able to vary the composition of the solvent so as to obtain the optimum solvent characteristics for each charge to be de-waxed.

Non-viscous lubricating oils contain paraffin waxes which are relatively soluble in the solvent so that in order to de-wax such an oil it will be advantageous to use a mixture which is rich in anti-solvent. Viscous oils, apart from the paraffin waxes which they contain, largely comprise hydrocarbons which are not very soluble and during the cooling stage of the de-waxing there is a risk that an insoluble oil phase will form and pass into the crystallised paraffin wax phase. In order to avoid this it is necessary to use a medium which is poor in anti-solvent.

It has now been found that the amount of water present in the solvent mixture has a considerable effect on the anti-solvent characteristics and that the effect differs for oils of different viscosities.

According to the present invention, therefore, a process for de-waxing lubricating oils by crystallising out the paraffin wax in a solvent in which two or more oils of differing viscosity are treated in succession with a mixture of methylisobutylketone and methylethylketone having a substantially constant composition comprises adjusting the water content of the mixture according to the viscosity of the oils, the most viscous oil being treated with a substantially anhydrous mixture and the less viscous oils being treated with water-containing mixtures, the amount of water increasing in proportion to the decreasing viscosity.

In the solvent mixture methylisobutylketone is the solvent and methylethylketone is the anti-solvent. The anti-solvent power of the methylethylketone is enhanced by increasing the water content and is reduced by reducing the water content.

The solvent mixture preferably contains between 40 and 100% especially between 60–100% by volume of methylisobutylketone and between 60 and 0% especially between 40 and 0% by volume of methylethylketone. Preferably the proportion of methylethylketone in the mixture is fixed so that the substantially anhydrous mixture gives the optimum treatment of the most viscous oil to be treated.

The term "substantially anhydrous" as used in this specification means a water content of 0.1% volume or less.

When it is required to de-wax a more fluid oil a greater anti-solvent action is required and the dehydration of the solvent medium is limited so that it contains more water than when treating more viscous oils. As stated above, however, the water content should not exceed that which, during the cooling stage, would involve the risk of bringing about the formation of an insoluble phase in addition to the paraffin wax crystals. This insoluble phase would consist of oil or crystals of ice which are harmful to the operation of the installation. Thus the water content may be varied from 0.1% up to the amount at which the mixture becomes supersaturated with water at the de-waxing conditions used and introduces the risk of ice formation and/or an insoluble oily phase on the filter. This supersaturation limit may be determined by experiment and is substantially independent of the oil being treated, being dependent upon the solubility of water in the solvent mixture at the de-waxing temperature employed. For example, using a solvent mixture containing 95% methylisobutylketone and 5% methylethylketone the maximum tolerable water contents avoiding ice formation at various de-waxing temperatures are indicated in the following table:

TABLE 1

| De-waxing temperature, ° C. | Water content of solvent percent weight |
|---|---|
| 0 | 1.1 |
| −10 | 0.9 |
| −20 | 0.7 |
| −30 | 0.55 |

The maximum water content which can be tolerated while avoiding the separation of one insoluble oily phase will depend upon the nature of the oil (i.e. its viscosity and origin), the composition of the solvent mixture and the dewaxing temperature. As seen in the above table, the lower the temperature employed, the lower is the maximum tolerable water content which avoids ice formation. A similar trend is observed in the formation of the undesirable oily phase.

As a guide, the following table gives an indication of suitable solvent proportions and water contents when treating at −15° C., lubricating oil fractions derived from a Kuwait crude oil.

TABLE 2

| Solvent composition: MIBK/MEK | 100/0 | 90/10 | 80/20 | 70/30 | 60/40 | 50/50 | 40/60 | 30/70 | 20/80 | 10/90 | 0/100 |
|---|---|---|---|---|---|---|---|---|---|---|---|
| Viscosity of refined oils having a VI of 97 (cst. at 210° F.): | | | | | | | | | | | |
| 30 (Bright stock) | 0.5 | 0 | — | — | — | — | — | — | — | — | — |
| 10 | 0.6 | 1.1 | 1.5 | 1.0 | 0.5 | 0 | — | — | — | — | — |
| 6.5 | 0.6 | 1.1 | 1.8 | 1.8 | 1.2 | 0.7 | 0 | — | — | — | — |
| 5.5 | 0.6 | 1.1 | 1.8 | 2.5 | 1.7 | 1.2 | 0.7 | 0 | — | — | — |
| 4.0 | 0.6 | 1.1 | 1.8 | 2.5 | 3.0 | 2.2 | 1.8 | 1.1 | 0.5 | 0 | — |

In the cases marked thus (—), de-waxing with dry solvent is not possible without the separation of an insoluble oily phase.

In order to extract, for example, lubricating oil fractions derived from a Zarazaitine crude oil, a solvent less rich in water or MEK is required than for treating the Kuwait fractions indicated above. For instance, using a solvent comprising 100% MIBK the maximum water toleration when treating the bright stock is 0.2% and using a solvent comprising 80% MIBK and 20% MEK, the maximum water content for treating an oil of 10 cst. viscosity is 0.7%.

In order to ensure the best use of a solvent, it is desirable to use the maximum water content consistent with optimum filterability. For example, in a unit treating only light Kuwait oils having viscosities of 4.0, 5.5 and 6.5 cst. at 210° F., it is desirable to use a solvent comprising 40% MIBK and 60% MEK, used dry for the 6.5 cst. oil, with 0.7% water for the 5.5 cst. oil and with 1.8% water for the 4.0 cst. oil, assuming a de-waxing temperature of −15° C. A unit treating all grades of Kuwait oil should employ a solvent containing 10% MEK used dry for bright stock and with 1.1% water for the other grades.

The overall practical limits of water content may be seen to be from 0.1 to 3.0% depending upon the solvent mixture employed, the de-waxing temperature and the type of oil being treated. It has been found that by increasing the water content of the solvent medium from 0.2% to 0.8%, by suitably regulating the dehydration operation, an increase in anti-solvent power is obtained equivalent to that which would result from an increase of 10% in the methylethylketone content of the dry solvent.

As stated earlier the solvent mixture is separated from the de-waxed oil phase and the paraffin wax phase for recycle and reuse, by distillation, and the water content of the mixture can be controlled and adjusted during the course of this recovery so as to give a mixture for reuse having the required water content. Preferably it is controlled and adjusted in a separate distillation step given to the mixture after separation from the oil and wax phases. Any increase in the water content which may have occurred during the previous cycle from moisture present in the lubricating oil or any increase which may have resulted from the use of steam to assist the separation of the mixture from the oil and wax phase may also be adjusted during this distillation.

In order to limit the number of variables, the ratio of methylisobutylketone and methylethylketone is kept substantially constant and the anti-solvent characteristics of the mixture are controlled by the water content. In practice, during the distillation certain amounts of methylethylketone may be entrained with the water separated off and any such loss is, therefore, made up by the addition of fresh methylethylketone or by decanting the removed methylethylketone from the removed water and returning it to the system.

The invention is of particular interest when a de-waxing unit has to treat a very wide range of oils of differing viscosity.

The invention is illustrated by means of the following examples.

Example I

DE-WAXING A VISCOUS BRIGHT STOCK OBTAINED FROM ZARAZAITINE CRUDE BY DISTILLING TO OBTAIN A RESIDUE AND REFINING THE RESIDUE WITH PROPANE AND FURFURAL

This bright stock had the following characteristics:

Density at 15° C. _____ 0.885.
Kinematic viscosity at 99° C. _____ 29 centistokes.
Pour point _____ 51° C.

The bright stock was de-waxed firstly with a dry solvent mixture comprising:

Methylisobutylketone, 93% by vol.
Methylethylketone, 7% by vol.

and secondly using the same solvent containing 1.5% of water.

| | Test 1, Dry | Test 2, 1.5% water by vol. |
|---|---|---|
| Conditions of de-waxing: | | |
| Ratio of solvent/oil, by vol. | 4:1 | 4:1. |
| Filtration temperature | −10° C | −10° C. |
| Thickness of wax cake | 4 mm | 4 mm. |
| Ratio of washing solvent to oil by vol. | 2:1 | 2:1. |
| Results: | | |
| Filtration output (litres of oil per sq. dm. filtration area and per hour). | 1.1 | 0.7. |
| Yield of filtrate by weight (after distillation of solvent). | 80.3% | 49.5%. |
| Quality of filtrate: | | |
| Kinematic viscosity at 50° C., in cst. | 225 | 254. |
| Viscosity index | 100 | 96. |
| ASTM pour point | −10° C | −11° C. |

The presence of 1.5% water in the solvent of test 2 brought about the separation of an oily phase which remained with the wax cake. This cake had a plastic appearance and washed very badly. There was found to be a considerable decrease in the yield of filtrate and a fall in its viscosity index, because the insoluble oily phase remaining in the cake consisted of paraffinic hydrocarbons with a very high viscosity index. The rate of filtration was bad for the same reason. In this case it is clearly necessary to operate with a dry solvent.

Example II

DE-WAXING AN OIL OF MEDIUM VISCOSITY DISTILLED FROM A KUWAIT CRUDE AND REFINED WITH FURFURAL

This oil had the following characteristics:

Density at 15° C. _____ 0.878.
Kinematic viscosity at 99° C. _____ 10.2 cst.
Kinematic viscosity at 50° C. _____ 47 cst.
ASTM pour point _____ +39° C.

The oil was de-waxed firstly with a dry solvent mixture comprising:

Methylisobutylketone, 95% by vol.
Methylethylketone, 5% by vol.

and secondly with the same solvent containing 1.5% of water.

|   | Test 1, Dry | Test 2, 1.5% water |
|---|---|---|
| De-waxing conditions: | | |
|   Ratio of solvent to oil, by vol | 3:1 | 3:1. |
|   Filtration temperature | −22° C | −22° C. |
| Filtration conditions: | | |
|   Thickness of wax cake | 6 mm | 6 mm. |
|   Ratio of washing solvent to oil, by vol. | 0.75:1 | 0.75:1. |
| Results: | | |
|   Filtration output (litres per sq. dm. and per hour). | 1.4 | 1.5. |
|   Yield of filtrate by weight (after distillation of solvent). | 77% | 76% |
| Quality of filtrate: | | |
|   Kinematic viscosity at 50° C., cst. | 61.9 | 62. |
|   Viscosity index | 97 | 97. |
|   ASTM pour point | −18° C | −20° C. |

Here the use of a solvent rich in water had the effect of increasing the filtration output, that is increased the production of the filters of the de-waxing unit. Furthermore the increase in the anti-solvent power of the mixture due to the presence of water reduced the de-waxing differential and gave a filtrate with a lower pour point. Experience has shown that by operating the de-waxing of test 2 at a temperature of −20° C., a pour point of −18° C. is obtained with a yield equal to that of test 1. It is therefore possible to obtain the same de-waxing effect, but with a less drastic cooling.

We claim:

1. A process for dewaxing lubricating oils by crystallizing-out the paraffin wax in a solvent, comprising treating in succession at least two oils of differing viscosity with a solvent having a substantially constant composition and containing 40–100% by volume of methyl isobutyl ketone and 60–0% by volume of methyl ethyl ketone; adjusting only the water content of the solvent within the range 0.1–3.0% by volume according to the viscosity of the oils, by subjecting the solvent recovered from the dewaxed oil and the wax to a separate continuous distillation step and therein dehydrating the solvent to the required extent while maintaining substantially constant the content of methyl isobutyl ketone and methyl ethyl ketone in the solvent, so that the most viscous oil is treated with a substantially anhydrous solvent and the less viscous oil is treated with a water-containing solvent, the amount of water increasing in proportion to the decreasing viscosity.

2. A process for dewaxing lubricating oils by crystallizing-out the paraffin wax in a solvent, comprising the steps of: treating in succession in separate stages at least two oils of differing viscosity with a solvent, to form wax crystals for separation from the oils, said solvent having a substantially constant composition and consisting essentially of from 40–100% by volume of methyl isobutyl ketone and from 60–0% by volume of methyl ethyl ketone; treating the most viscous of said oils with said solvent with the water content only of said solvent adjusted to not above 0.1% by volume so that said solvent is substantially anhydrous; treating the less viscous oil with said solvent with the water content only of said solvent adjusted to an amount within the range 0.1–3.0% by volume according to the viscosity of the oil being treated, the adjusted water content increasing in proportion to the decreasing viscosity of the oil being treated but being less than the volume percent in said range which would bring about the formation in the oil of an insoluble phase in addition to the wax crystals; recovering the solvent from the dewaxed oil and wax; adjusting only the water content of the recovered solvent within the range 0.1–3.0% while maintaining the solvent composition substantially constant, by subjecting the recovered solvent to a separate continuous distillation operation dehydrating the solvent to the required extent while maintaining substantially constant the content of methyl isobutyl ketone and methyl ethyl ketone in the solvent; and employing said solvent adjusted only as to water content, for treating said oils.

3. A process as claimed in claim 1 wherein the methylethylketone content of the solvent mixture is fixed so that the substantially anhydrous mixture is capable of treating under optimum conditions the most viscous oil required to be treated.

References Cited by the Examiner

UNITED STATES PATENTS

| 1,669,151 | 5/1928 | Wagner | 208—33 |
| 2,550,058 | 4/1951 | Gee | 208—33 |

FOREIGN PATENTS 847,772    9/1960    Great Britain.

DELBERT E. GANTZ, *Primary Examiner.*

ALPHONSO D. SULLIVAN, *Examiner.*

H. LEVINE, *Assistant Examiner.*